C. SINTZ.
DRIVING WHEEL.
APPLICATION FILED AUG. 14, 1912.

1,102,447.

Patented July 7, 1914.

2 SHEETS—SHEET 1.

Witnesses
Harold O. Van Antwerp
Pearl Cary

Inventor
Claude Sintz
By Luther V. Moulton
Attorney

C. SINTZ.
DRIVING WHEEL.
APPLICATION FILED AUG. 14, 1912.
1,102,447.
Patented July 7, 1914.
2 SHEETS—SHEET 2.
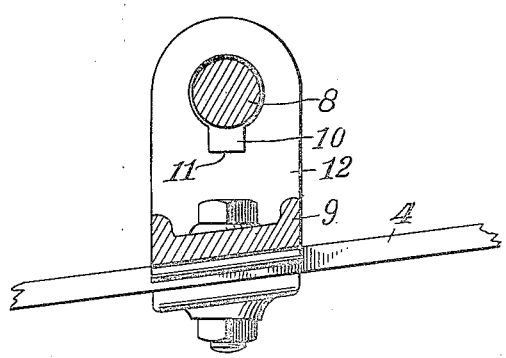
Fig. 4.
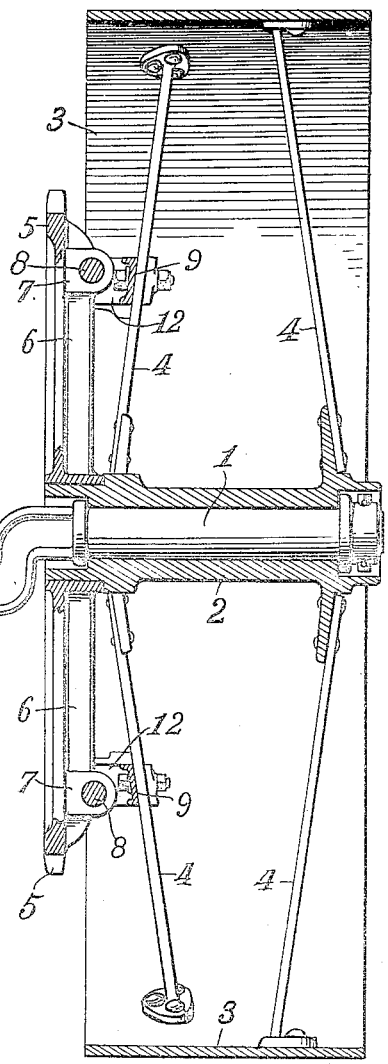
Fig. 2.
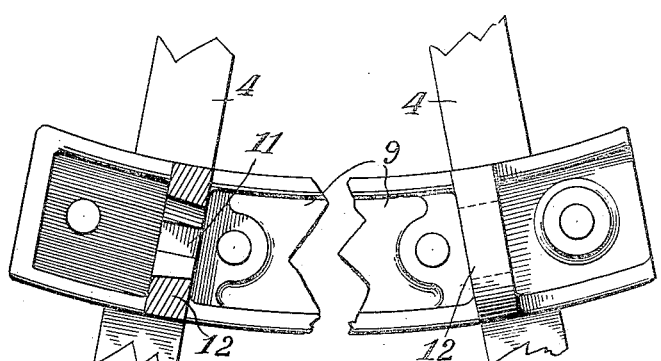
Fig. 5.
Fig. 6.
Witnesses
Harold O Van Antwerp
Pearl Cary.
Inventor
Claude Sintz.
By Luther V. Moulton
Attorney

UNITED STATES PATENT OFFICE.

CLAUDE SINTZ, OF DETROIT, MICHIGAN.

DRIVING-WHEEL.

1,102,447.  Specification of Letters Patent.  Patented July 7, 1914.

Application filed August 14, 1912. Serial No. 715,051.

*To all whom it may concern:*

Be it known that I, CLAUDE SINTZ, a citizen of the United States of America, residing at Detroit, in the county of Wayne and State of Michigan, have invented certain new and useful Improvements in Driving-Wheels; and I do hereby declare the following to be a full, clear, and exact description of the invention, such as will enable others skilled in the art to which it appertains to make and use the same.

Figure 1:
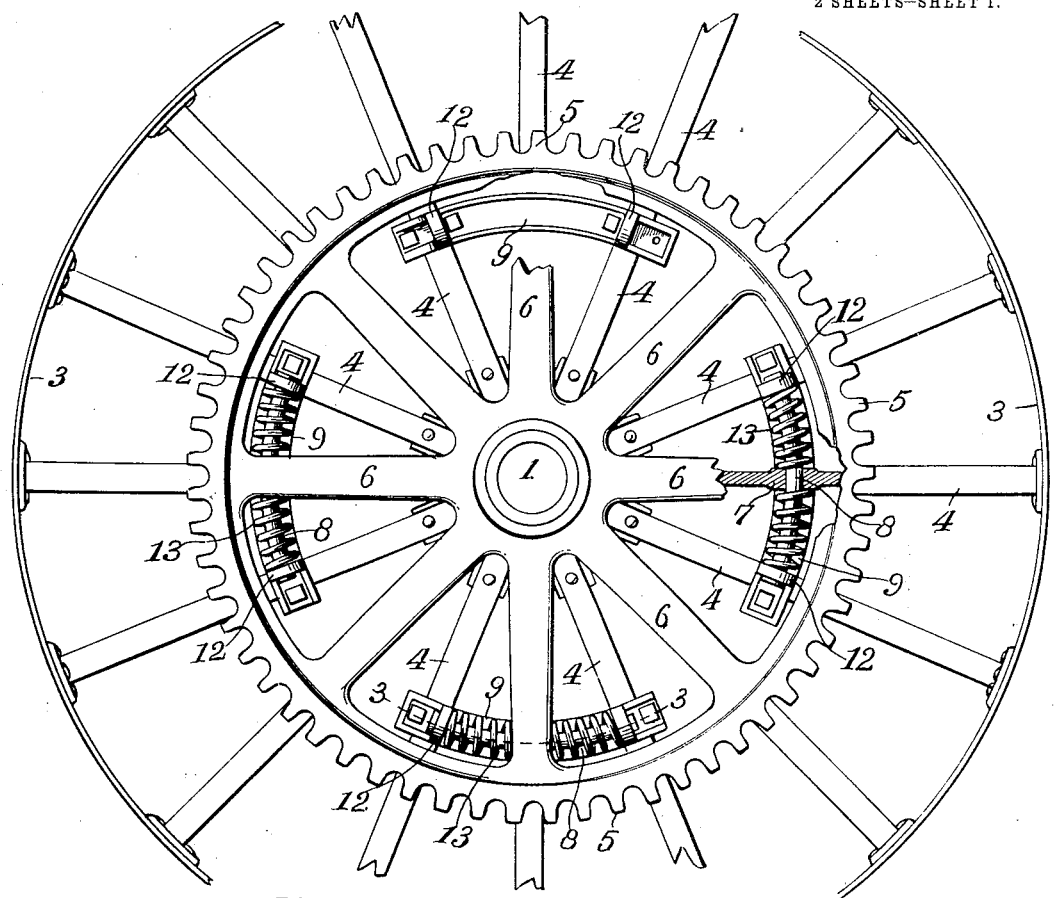
Figure 3:
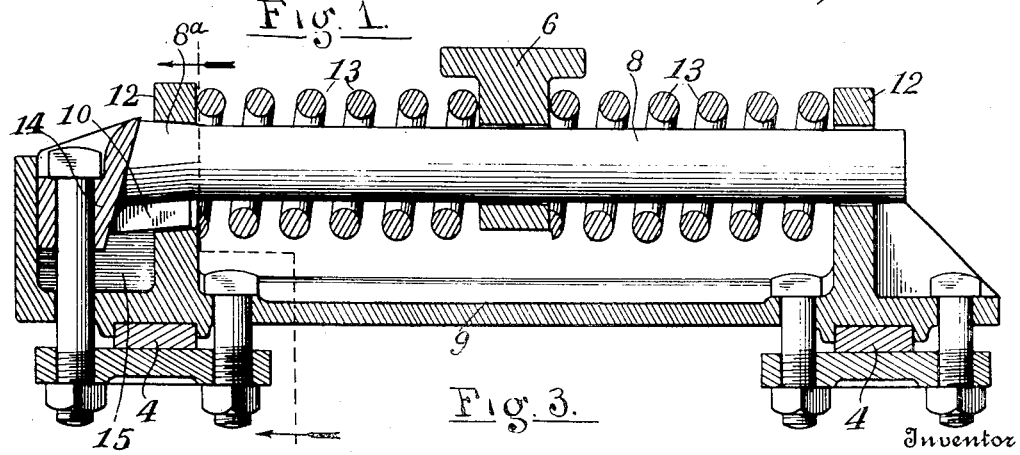

My invention relates to improvements in the driving wheels of traction engines and its object is to provide the same with yieldable connections between the motor and the wheel, and to provide the same with various new and useful features hereinafter more fully described and particularly pointed out in the claims, reference being had to the accompanying drawings in which:

Figure 1 is an elevation of a traction wheel with my device attached thereto, with portions broken away to show the construction; Fig. 2 is a vertical section of the same; Fig. 3 is an enlarged detail of a portion of the means for connecting the driving wheel to the traction wheel; Fig. 4 a detail partially in longitudinal section of the means for connecting the driving wheel and the traction wheel; Fig. 5 a detail of the segment to which the driving wheel is connected; and Fig. 6 is a detail of the frame on which the segment is mounted.

Like numbers refer to like parts in all of the figures.

1 represents the axle, 2 the hub, 3 the rim, and 4 the spokes of a traction wheel substantially as usually made.

5 is a wheel for driving the traction wheel, preferably a sprocket wheel to receive a suitable chain driven by any convenient motor. This wheel is provided with arms 6 (eight such arms being shown,) four of which are preferably provided with lugs 7 on the side toward the traction wheel each lug being provided with an opening through which extends a segment 8 preferably circular in cross sections and arranged concentric with the axis of the wheel. These segments are mounted in a curved frame 9 also concentric with the axis of the wheels and secured to the spokes 4 of the traction wheel by suitable clips and bolts as shown in Fig. 3 each frame is provided with lugs 12 near its respective ends in which the segment 8 is fixed, and to secure each segment in place it is provided at one end with a conical or tapered portion 8ª and a key 10 to engage suitable openings 11 in one of the lugs 12 and is forced into such opening by a wedge block 14 inserted in a recess 15 in the end of the frame and held therein by one of the clips or bolts as shown in Fig. 3. Each arm 6 is yieldably held normally in mid-position on the respective segment 8 by means of springs 13 surrounding the segment and located between the lug on the arm and the lugs 12 on the frame 9. The wheel 5 thus has a yieldable connection with the traction wheel and while rotating with the same also rotates slightly relative to the rotation of the traction wheel whereby the driving stress operates to compress the springs, the lugs 7 sliding on the segments 8 whereby sudden strains or shocks are relieved by the springs. The device will thus traverse a rough road without undue strains upon the mechanism.

What I claim is:

1. The combination of a traction wheel and a driving wheel arranged co-axially, the driving wheel having a limited rotary movement relative to the traction wheel and normally rotating therewith, segments fixed on one of the said wheels, the other of said wheels having lugs surrounding the segments, and springs engaging the lugs to yieldably hold the same in normal mid-position and slidable on the segments.

2. The combination of a traction wheel and a driving wheel arranged co-axially, the driving wheel having a limited rotary movement relative to the traction wheel and normally rotative therewith, segments mounted on the spokes of the traction wheel, the spokes of the driving wheel having lugs surrounding the segments and slidable thereon, and opposing springs on the segments engaging the lugs, to yieldably hold the same in mid-position on the segments.

3. The combination of a traction wheel and a driving wheel arranged co-axially, the driving wheel having a limited rotary movement relative to the traction wheel and normally rotating therewith, frames mounted on the spokes of the traction wheel, segments mounted on the frames concentric with the axis of the wheels, the respective ends of the frames having lugs supporting the segments, the spokes of the driving wheel also having lugs slidable on the segments, and opposing springs on each segment engaging the lug on the driving wheel at one end and engaging the lugs at the respective ends of the frame at the other end.

4. The combination of a traction wheel and a driving wheel arranged co-axially, the driving wheel having a limited rotary movement relative to the traction wheel and normally rotating therewith, a frame mounted on the spokes of the traction wheel, the respective ends of the frame, each provided with a lug having an opening, a segment mounted in said frame concentric with the axis of the wheel, one end of the segment having a conical portion and a key fitting in one of said openings, a wedge block engaging the end of the segment to secure it in said openings, clips to secure the frame to the spokes of the traction wheel, bolts to secure the clips and wedge block, on the driving wheel having a lug slidable on the segment, and springs on the segment between the lugs on the frame and the lug on the wheel.

In testimony whereof I affix my signature in presence of two witnesses.

CLAUDE SINTZ.

Witnesses:
HAROLD O. VAN ANTWERP,
LUTHER V. MOULTON.